(12) United States Patent
Nelson

(10) Patent No.: US 6,307,710 B1
(45) Date of Patent: Oct. 23, 2001

(54) STORAGE DISK CARTRIDGE

(75) Inventor: Michael Paul Nelson, Kaysville, UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/193,206

(22) Filed: Nov. 17, 1998

(51) Int. Cl.$^7$ .................................................. G11B 23/03

(52) U.S. Cl. ........................................... 360/133; 369/291

(58) Field of Search .............................. 360/133; 369/291

(56) References Cited

U.S. PATENT DOCUMENTS

| | | | |
|---|---|---|---|
| Re. 32,876 | 2/1989 | Wakbayashi et al. ............... | 360/133 |
| 3,416,150 | 12/1968 | Lindberg, Jr. ..................... | 340/174.1 |
| 3,529,301 | 9/1970 | Hiruta et al. ...................... | 340/174.1 |
| 3,746,346 | 7/1973 | Mayer et al. ........................ | 274/9 R |
| 4,399,480 | 8/1983 | Edwards ............................... | 360/132 |
| 4,470,083 * | 9/1984 | Doering et al. ...................... | 360/128 |
| 4,546,397 | 10/1985 | Asami et al. .......................... | 360/99 |
| 5,724,217 * | 3/1998 | Oishi .................................... | 360/133 |
| 5,764,623 * | 6/1998 | Akiyama et al. .................... | 369/291 |
| 5,898,551 * | 4/1999 | Watanabe ............................. | 360/133 |
| 5,946,630 * | 8/1999 | Willars et al. ....................... | 455/466 |
| 5,963,538 * | 10/1999 | Koshiyouji ........................... | 369/291 |
| 6,018,433 * | 1/2000 | Thayne et al. ....................... | 360/69 |
| 6,018,446 * | 1/2000 | Kato et al. ........................... | 360/133 |

FOREIGN PATENT DOCUMENTS

| | | |
|---|---|---|
| 51-27112 | 2/1976 | (JP) . |
| 09073749 * | 3/1997 | (JP) . |

OTHER PUBLICATIONS

Iomega Zip Disk, with broken–away portion showing torsion spring, Date of first disclosure is more than one year prior to Nov. 17, 1998, 1 page.

Nomai Zip–Type Disk, with broken–away portion showing compression spring, Date of first disclosure is more than one year prior to Nov. 17, 1998, 1 page.

\* cited by examiner

*Primary Examiner*—David L. Ometz
*Assistant Examiner*—Angel Castro
(74) *Attorney, Agent, or Firm*—Woodcock Washburn Kurtz Mackiewicz & Norris, LLP

(57) ABSTRACT

A storage disk cartridge comprises a storage disk, a shell, a linear shutter, and a compression spring. The shell has first and second main walls generally parallel to the storage disk and encasing the storage disk there between. The storage disk is rotatable within the shell. The shell also has a side wall extending between the first and second main walls. A head access aperture is formed in the side wall. The aperture enables a head to be inserted into the shell to be positioned in operative relationship with respect to the storage disk. The linear shutter is mounted to the shell, and is generally linearly movable between a closed position where the shutter covers the aperture and an open position where the shutter exposes the aperture. A compression spring is coupled to the shell and to the linear shutter and biases the shutter to the closed position.

7 Claims, 3 Drawing Sheets

STORAGE DISK CARTRIDGE

FIELD OF THE INVENTION

The present invention relates to a storage disk cartridge. More particularly, the present invention relates to such a storage disk cartridge having a compression spring biasing a linear shutter to a closed position.

BACKGROUND OF THE INVENTION

A storage disk cartridge, particularly for a magnetic storage disk, typically comprises an external shell encasing the storage disk, a head access aperture in the shell for enabling a head to be moved into position with respect to the disk, a shutter mounted to the shell to appropriately cover or expose the aperture, and a spring that biases the shutter to cover the aperture.

In many instances, the spring is a torsion spring having one arm attached to the shell and the other arm attached to the shutter. As is known, the operative portion of such a torsion spring comprises a generally helical coil of wire wound around an axis, where loading and unloading of such torsion spring causes circumferential rotation of the windings of such coil about such axis. Such torsion spring is typically positioned in the interior of a disk cartridge along with the storage disk such that the axis of the helical coil and the axis of the disk are generally parallel. While torsion springs have been found to work acceptably in general, several problems have been identified.

Firstly, to fit a torsion spring into the available space inside a disk cartridge while at the same time keeping stresses relatively low, such torsion spring must have a relatively large radius for the helical coil and a relatively small number of windings in such helical coil. Such constraints limit the number of torsion spring designs that are viable, especially when the available space inside the disk cartridge is confined. Morever such viable designs may not be optimal in terms of reliability or case of manufacture and/or assembly. Secondly, in a torsion spring, the coil windings in the helical coil must be free to individually circumferentially rotate during loading and un-loading. As a result, the helical coil cannot be over-molded with a protective covering. Thirdly, automated manufacturing and/or assembling of springs becomes more difficult as the radius of the spring helical coil increases. In particular, the coil windings tend to tangle more as the radius of the helical coil increases.

Accordingly, a need exists for a storage disk cartridge having an alternative type of spring biasing the cartridge shutter to cover the cartridge aperture.

SUMMARY OF THE INVENTION

The present invention satisfies the aforementioned need by providing a storage disk cartridge comprising a storage disk, a shell, a linear shutter, and a compression spring. The shell has first and second main walls generally parallel to the storage disk and encasing the storage disk there between. The storage disk is rotatable within the shell. The shell also has a side wall extending between the first and second main walls. A head access aperture is formed in the side wall. The aperture enables a head to be inserted into the shell to be positioned in operative relationship with respect to the storage disk. The linear shutter is mounted to the shell, and is generally linearly movable between a closed position where the shutter covers the aperture and an open position where the shutter exposes the aperture. A compression spring is coupled to the shell and to the shutter and biases the shutter to the closed position.

BRIEF DESCRIPTION OF THE DRAWINGS

The foregoing summary as well as the following detailed description of the present invention will be better understood when read in conjunction with the appended drawings. It should be understood, however, that the invention is not limited to the precise arrangements and instrumentality shown. In the drawings.

DETAILED DESCRIPTION OF PREFERRED EMBODIMENTS

Figure 1:
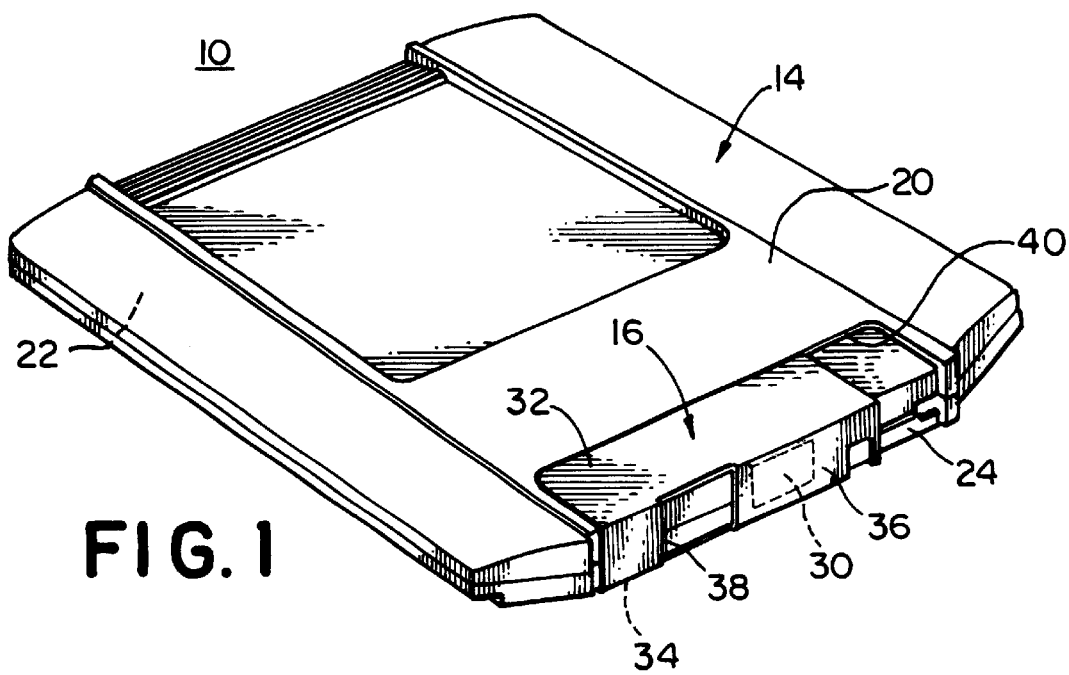
FIGS. 1–3 are respectively top, bottom, and top perspective views of a storage disk cartridge in accordance with one embodiment of the present invention, and show the linear shutter of the cartridge in a closed position (FIGS. 1 and 2) and an open position (FIG. 3)

Certain terminology may be used in the following description for convenience only and is not considered to be limiting. The words "left", "right", "upper", and "lower" designate directions in the drawings to which reference is made. The words "inwardly" and "outwardly" are further directions toward and away from, respectively, the geometric center of the referenced object. The terminology includes the words above specifically mentioned, derivatives thereof, and words of similar import.

Figure 2:
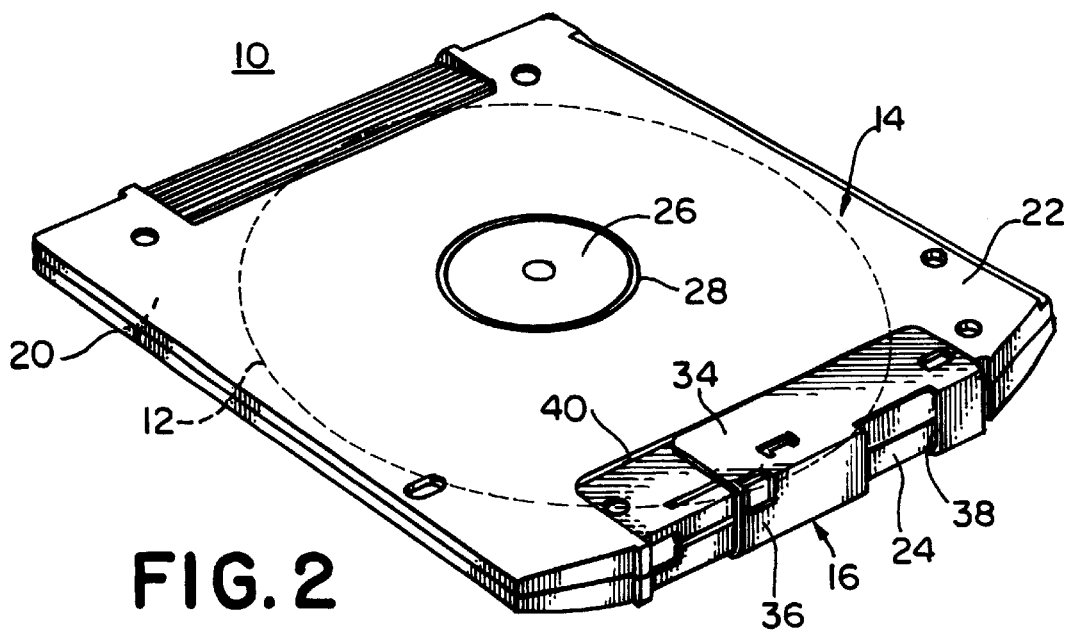
Figure 3:
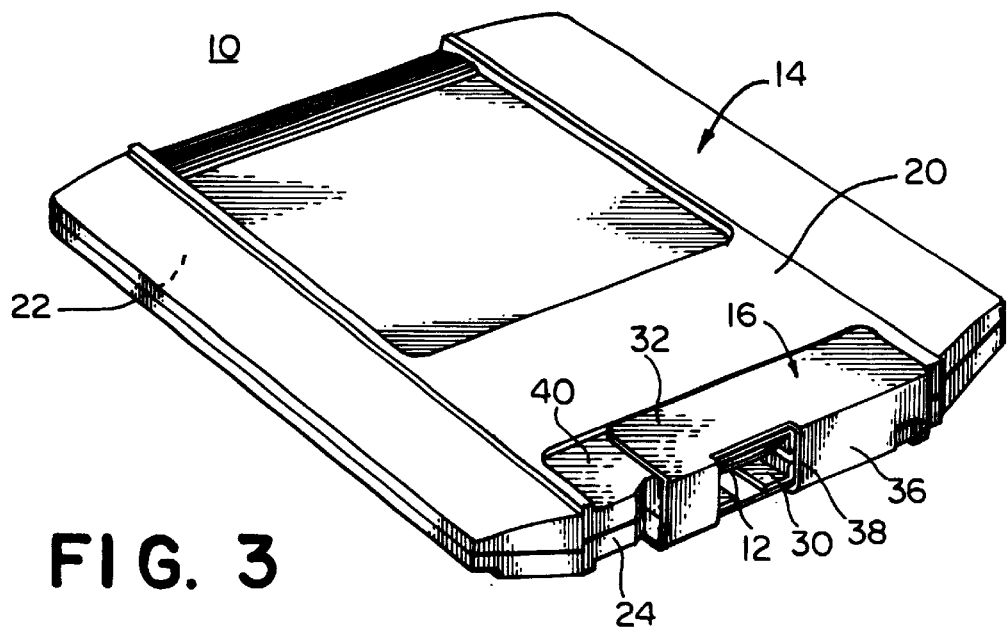
Figure 4:
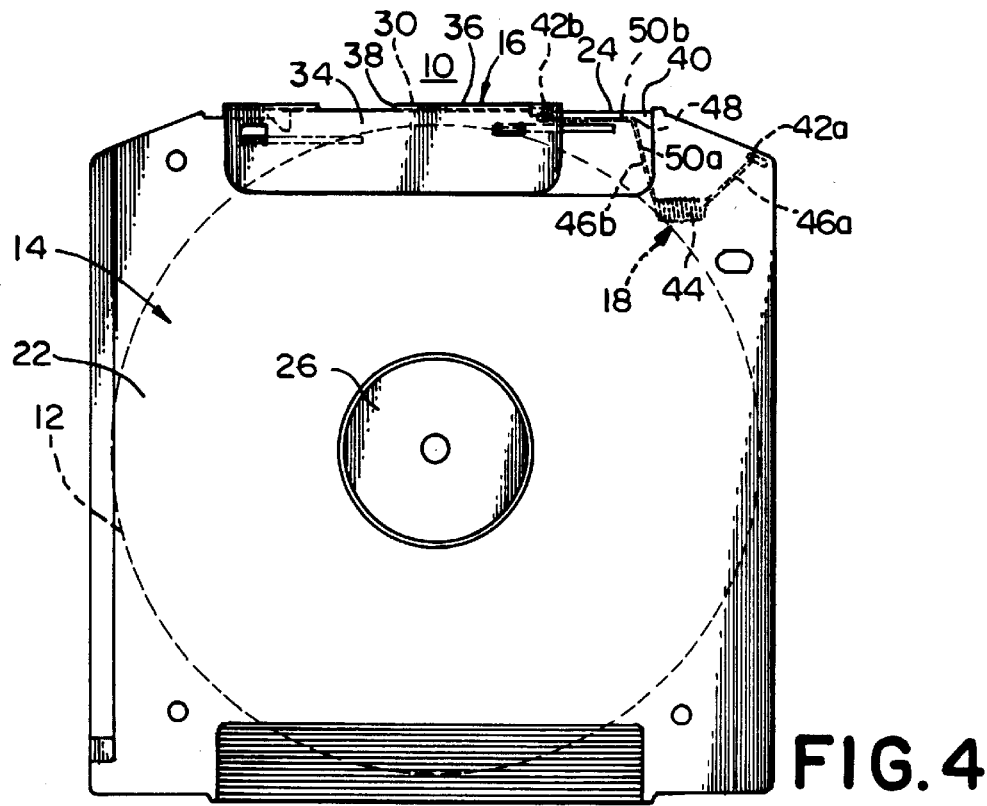
FIGS. 4 and 5 are bottom plan views of the storage disk cartridge of FIGS. 1–3, and show (in phantom) the compression spring of the cartridge when the linear shutter is in the closed position (FIG. 4) and in the open position (FIG. 5).
Figure 5:
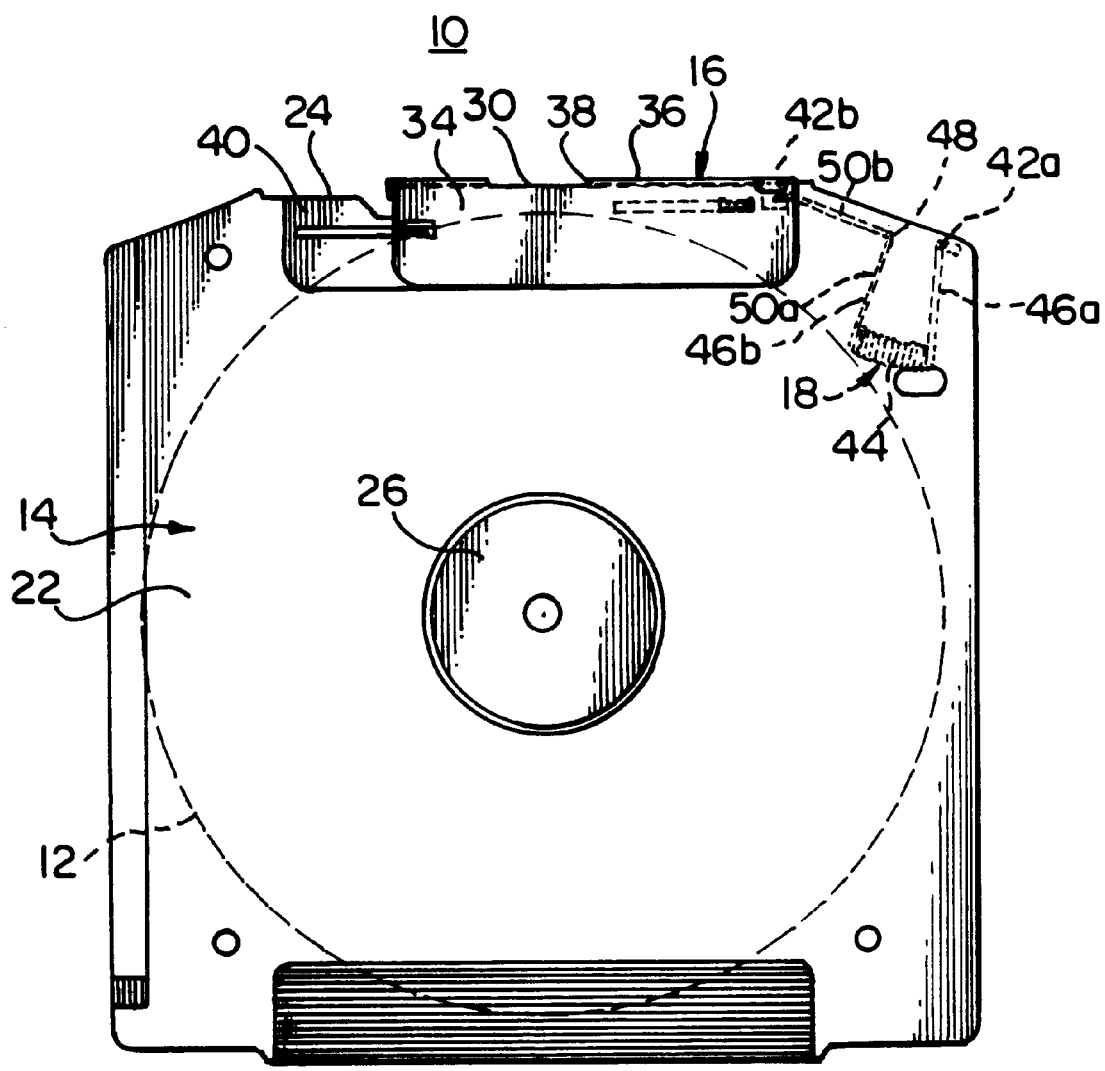

Referring to the drawings in detail wherein like numerals are used to indicate like elements throughout, there is shown in FIGS. 1–3 a storage disk cartridge 10 in one embodiment of the present invention. As seen, the cartridge 10 has a storage disk 12, a shell 14, a linear shutter 16 and a compression spring 18 (FIGS. 4 and 5).

The shell 14 has first and second main walls 20, 22 which are generally parallel to the storage disk 12 (as best seen in FIG. 2), and which encase the storage disk 12 therebetween. The storage disk 12 is freely rotatable within the shell 14. The shell 14 also has a side wall 24 extending between the first and second main walls 20, 22, where such side wall 24 is a main side wall at one side face of the shell 14. As is shown, the storage disk 12 may also have other side walls extending between the first and second main walls 20, 22 at other side faces of the shell 14. However, such other side walls are not of particular interest here. It does bear noting, though, that such other side walls need not necessarily have the same main wall to main wall width as the side wall 24, as is shown in FIGS. 1–3.

In the embodiment shown in the drawings, the shell 14 is formed from a pair of top and bottom cassette shell halves. Each shell half may be appropriately constructed from molded plastic, and the shell halves may be appropriately joined by screws, sonic welding, heat welding, glue, etc. However, it will be recognized that other materials may be employed to form the shell halves and other methods may be employed to join the shell halves without departing from the spirit and scope of the present invention. It will also be recognized that the shell 14 may be formed from building blocks other than shell halves without departing from the spirit and scope of the present invention.

Viewed directly toward the side wall 24, the formed shell 14 has a substantially flat hexahedron cross-sectional shape.

Viewed directly toward the first or second main walls 20, the shell 14 is approximately square in shape and has an area slightly larger than that of the storage disk 12 encased therein. However, the shell 14 can have other shapes without departing from the spirit and scope of the present invention, so long as the shape of the shell 14 satisfies the functional requirements of operating the storage disk 12 therein.

In one embodiment of the present invention, the storage disk 12 is a magnetic storage disk. However, it will be recognized that other types of storage disks may be employed without departing from the spirit and scope of the present invention. For example, the storage disk 12 may alternatively be an optical storage disk, an engraved platter, a hole-punched platter, and the like. In addition, the present invention may be implemented with storage media other than the storage disk 12, such as an endless-loop storage tape (not shown), for example. In any case, the storage disk 12 or other storage media is appropriately constructed to store data and read out such data in the manner desired.

As is shown, the storage disk 12 includes an engaging hub 26 (FIG. 2), where the hub 26 faces into a circular aperture 28 in the second main wall 22 of the shell 14. As should be understood, the hub 26 is engaged by a motorized spindle of an appropriate drive (not shown) to thereby rotate the storage disk 12 within the shell 14.

As particularly seen in FIGS. 1 and 3, a head access aperture 30 is formed in the side wall 24. The aperture 30 enables a head (not shown) of the aforementioned drive to be inserted into the shell 14 to be positioned in operative relationship with respect to the storage disk 12. Typically, the head is a read head, a write head, a read/write head, or the like. As may be appreciated from FIGS. 1 and 3, in one embodiment of the present invention, the head is moved generally radially into and in the shell 14 along a line substantially parallel to, if not coplanar to, the plane of the storage disk 12 encased within the shell 14. However, other head movement methods may be employed without departing from the spirit and scope of the present invention. For example, the head may be angled into and in the shell 14 through the aperture 30. Typically, the head is brought in close contact with, or close to, the wall of the storage disk 12 so as to read information from and/or write information to the wall of the storage disk 12.

The linear shutter 16 is mounted to the shell 14, and is generally linearly moveable between a closed position where the linear shutter 16 covers the aperture 30 (FIGS. 1 and 2), and an open position where the linear shutter 16 exposes the aperture 30 (FIG. 3). In one embodiment of the present invention, the linear shutter 16 includes one or more tabs that run along corresponding linearly extending slots in one or both main walls 20, 22 of the shell 14, where the slots and tabs guide the linear shutter 16 along the shell 14, and also prevent the linear shutter 16 from easily separating from the shell 14. However, other mounting and guiding means may be employed without departing from the spirit and scope of the present invention. Preferably, and as seen in the drawings, the side wall 24 of the shell 14 is in relevant part generally linear in a direction generally tangential to the storage disk 12, and the linear shutter 16 is mounted to the side wall 24. Accordingly, the linear shutter 16 is generally linearly moveable along the side wall 24 in the tangential direction between the closed position (FIGS. 1 and 2) and the open position (FIG. 3).

Preferably, and as may be appreciated from FIGS. 1-3, the linear shutter 16 is a formed sheet member that extends along the first and second main walls 20, 22 and the side wall 24 of the shell 14. As seen, the linear shutter 16 preferably has first and second wings 32, 34 that respectively extend along the first and second main walls 20, 22, and a shutter body 36 that interconnects the first and second wings 32, 34 and extends along the side wall 24. As also seen, the shutter body 36 preferably covers the head access aperture 30 in the closed position (FIGS. 1 and 2) and exposes the aperture 30 in the open position (FIG. 3). Preferably, the shutter body 36 includes a window 38 formed therein such that the window 38 exposes the head access aperture 30 when the linear shutter 16 is in the open position (FIG. 2). However, the linear shutter 16 may have other designs without departing from the spirit and scope of the present invention. For example, the linear shutter 16 need not necessarily have the first and second wings 32, 34, or even the window 38. In such a case, the linear shutter 16 may merely be a flat sheet of material that runs along the side wall 24 between the open and closed positions, perhaps within slots on the shell 14 that capture the transverse edges of such linear shutter 16.

As seen in FIGS. 1 though 3, the linear shutter 16 having the first and second wings 32, 34 and shutter body 36 is constituted as a sectionally U-shaped member. In one embodiment of the present invention, such linear shutter 16 member is formed by appropriately bending a flat piece of sheet material such as an appropriate grade of sheet metal. However, other materials may be employed and other methods of forming the linear shutter 16 may also be employed without departing from the spirit and scope of the present invention. For example, the linear shutter 16 may be appropriately molded in its final form from an appropriate plastic resin or elastimeric material.

Preferably, the first and second wings 34, 34 and shutter body 36 of the linear shutter 16 are formed to fit relatively closely to the first and second main walls 20, 22 and the side wall 24, respectively, such that the linear shutter 16 is generally coextensive with such walls 20, 22, 24. Accordingly, and in particular, the shutter body 36 of the linear shutter 16 is preferably generally linear itself in the direction generally tangential to the storage disk 12, as is the side wall 24 of the shell 14.

As seen in FIGS. 1-3, in one embodiment of the present invention, a shallow recess 40 is formed in portions of the first and second main walls 20, 22 and the side wall 24 of the shell 14 adjacent the aperture 30. Accordingly, the first and second wings 32, 34 and shutter body 36 of the linear shutter 16 reside within and linearly move within such recess 40, and the recess 40 defines the linear extent of movement of the linear shutter 16 along the side wall 24 of the shell 14, absent any other limiting features.

The disk cartridge 10 of the present invention is intended to be used in the same manner as other similar prior art disk cartridges. Accordingly, the cartridge 10 may be inserted within an appropriate drive (not shown) designed to accept such prior art disk cartridges. Preferably, prior to insertion into the drive and after removal from the drive, the linear shutter 16 of the disk cartridge 10 is in the closed position such that the aperture 30 is covered (FIGS. 1 and 2). Also preferably, upon being inserted in to the drive, the linear shutter 16 is moved from the closed position to the open position such that the aperture 30 is exposed. Accordingly, the aperture 30 is exposed only upon the disk cartridge 10 being positioned within the drive, and undesirable foreign material is precluded from entering through the aperture 30 into the shell 14 when the disk cartridge 10 is outside the drive 10. As is known, the drive includes appropriate operating structure to perform the aforementioned opening and closing functions on the linear shutter 16 of the cartridge 10.

Once the disk cartridge 10 is inserted into the drive, and once the drive moves the linear shutter 16 to the open position, the drive can then insert the aforementioned drive bead within the shell 14 of the cartridge 10 through the exposed aperture 30. Such head is then positioned in operative relationship with respect to the storage disk 12 within the cartridge 10 in an appropriate manner that need not be described herein.

To facilitate the movement of the linear shutter 16 between the open and closed positions, the cartridge 10 is provided with the aforementioned compression spring 18. As is shown in FIGS. 4 and 5, the compression spring 18 (shown in phantom) is coupled to the shell 14 (at the right side of such compression spring 18) and to the linear shutter 16 (at the left side of such compression spring 18). As seen, the compression spring 18 is positioned in the interior of the disk cartridge 12. However, the compression spring 18 could instead be appropriately positioned on the exterior of the disk cartridge 12 without departing from the spirit and scope of the present invention.

Preferably, such compression spring 18 biases the linear shutter 16 to the closed position of FIG. 4. Accordingly, such linear shutter 16 is automatically closed when not inserted within a drive. With the compression spring 18 so biased, a drive receiving the disk cartridge 10 of the present invention need only include structure for moving the linear shutter 16 from the closed position (FIG. 4) to the open position (FIG. 5). Correspondingly, no additional structure is needed in such a drive to move the linear shutter 16 from such open position to such closed position.

Preferably, and as seen in FIGS. 4 and 5, the compression spring 18 includes a helical coil 44 wound around an axis A that is generally coplanar with the storage disk 12 as such storage disk 12 is encased within the disk cartridge 10. As shown, such axis A need not be tangential to such storage disk 12, although such tangentiality could exist without departing from the spirit and scope of the present invention. The compression spring 18 also includes arms 46a, 46b extending from either side of the helical coil 44.

Preferably, the compression spring is formed as a unitary body from a material that has a high elasticity over an extended period of time and use. For example, in one embodiment of the present invention, the compression spring 18 is constructed from 304 stainless steel. Preferably, for a compression spring 18 employed in an IOMEGA ZIP100 storage disk 12 or the like, the coil 44 of the compression spring 18 has an axial length of about 0.1 inches and about 5 windings, and each winding has a diameter of about 1.5 millimeters. However, it will be recognized that other materials may be employed without departing from the spirit and scope of the present invention, including other types of stainless steel and materials other than stainless steel, and that other coil dimensions may likewise be employed without departing from the spirit and scope of the present invention.

Still referring to FIGS. 4 and 5, the compression spring 18 is coupled via the arm 46a to the shell 14 at a first contact point 42a, and is coupled via the arm 46b to the linear shutter 16 at a second contact point 42b. The particular means of achieving such coupling should be apparent and therefore need not be described in detail herein. For example, the end of each arm 46a, 46b of the compression spring 18 may have a pin (not shown) that is received by a respective receptacle in the shell 14 and the linear shutter 16. However, any appropriate coupling means may be employed without departing from the spirit and scope of the present invention.

In the embodiment shown in FIGS. 4 and 5, the arm 46a extends directly from the coil 44 to the first contact point 42a, while the arm 46b extends indirectly from the coil 44 to the second contact point 42b. As seen, the arm 46b is interrupted by an elbow 48 that divides such arm 46b into proximal and distal portions 50a, 50b. 30 Accordingly, and as shown, when the linear shutter 16 is moved from the closed position (FIG. 4) to the open position (FIG. 5), the arm 46b will likely bend at the elbow 48, and the compression spring 18 will likely bend along its axis A. As a result, the elbow 48 will move in a more-or-less linear fashion directly toward the first contact point 42a. As a result, the distal portion 50b of the arm 46b also moves directly toward the first contact point, and also somewhat inwardly with respect to the shell 14, such that the distal portion 50b and the elbow 48 do not conflict with the interior of any of the walls of the shell 14. Of course, many other designs may be employed for the compression spring 18 without departing from the spirit and scope of the present invention so long as such compression spring 18 does not contact or otherwise interfere with the operation of the storage disk 12 within the shell 14. Preferably, for a compression spring 18 employed in an IOMEGA ZIP100 storage disk 12 or the like, the arm 46a is about 10 millimeters, and the proximal and distal portions 50a, 50b of the arm 46b are about 10 and about 15.5 millimeters, respectively.

As should now be understood, the compression spring 18 of the storage disk cartridge 10 of the present invention is advantageous over the torsion spring (not shown) of the prior art. Because the compression spring 18 has a relatively large number of windings in the helical coil as compared with a typical prior art torsion spring, the load forces are spread over more windings. Accordingly, each winding can be stressed less and stress on the arms 46a, 46b can be reduced, thereby minimizing decreases in spring force over extended periods of time and thousands of load and un-load cycles. Also, the compression spring 18 of the present invention is highly reliable and can be manufactured and/or assembled with relative ease. Moreover, if so desired, the helical coil of the compression spring 18 can be over-molded with a compliant protective covering, inasmuch as the coil windings in the helical coil do not move significantly with respect to each other during loading and unloading. Accordingly, the use of such compression spring 18 in connection with such linear shutter 16 helps to ensure smoother and more reliable operation of such linear shutter 16 over a longer lifetime and a longer number of cycles as compared with the use of a prior art torsion spring.

In the present invention, a compression spring 18 and linear shutter 16 are employed in a storage disk cartridge 10. It should be appreciated by those skilled in the art that changes could be made to the embodiments described above without departing from the inventive concepts thereof. For example, compression spring 18 may be constructed such that arm 46b is straight and does not include elbow 48. It is understood, therefore, that this invention is not limited to the particular embodiments disclosed, but instead encompasses modifications within the spirit and scope of the present invention as defined by the appended claims.

What is claimed is:

1. A storage disk cartridge comprising:
   a storage disk;
   a shell having first and second main walls generally parallel to the storage disk and encasing the storage disk there between, the storage disk being rotatable within the shell, the shell also having a side wall extending between the first and second main walls;

a head access aperture formed in the side wall, the aperture for enabling a head to be inserted into the shell to be positioned in operative relationship with respect to the storage disk;

a linear shutter mounted to the shell, the shutter being generally linearly movable between a closed position where the shutter covers the aperture and an open position where the shutter exposes the aperture;

a compression spring coupled to the shell and to the shutter and biasing the shutter to the closed position, the compression spring having a helical coil wound around an axis, the axis bending when the linear shutter is moved to the open position, the compression spring further having a first arm coupling one end of the coil to the shell and a second arm coupling the other end of the coil to the linear shutter, the second arm having a bending elbow dividing the second arm into proximal and distal portions, the bending elbow bending when the shutter is moved to the open position.

2. The cartridge of claim 1 wherein the storage disk is selected from a group consisting of a magnetic storage disk and an optical storage disk.

3. The cartridge of claim 1 wherein the side wall of the shell is generally linear in a direction generally tangential to the storage disk, and wherein the linear shutter is mounted to the side wall and is generally linearly movable in the tangential direction along the side wall between the closed position and the open position.

4. The cartridge of claim 3 wherein the linear shutter is a sheet member extending along the first and second main walls and the side wall of the shell, the shutter having first and second wings respectively extending along the first and second main walls and a shutter body interconnecting the first and second wings, the shutter body covering the head access aperture in the closed position and exposing the aperture in the open position.

5. The cartridge of claim 4 wherein the shutter body includes a window formed therein, the window exposing the head access aperture in the open position.

6. The cartridge of claim 1 wherein the axis is generally coplanar with the storage disk.

7. A storage disk cartridge comprising:

a storage disk selected from a group consisting of a magnetic storage disk and an optical storage disk;

a shell having first and second main walls generally parallel to the storage disk and encasing the storage disk there between, the storage disk being rotatable within the shell, the shell also having a side wall extending between the first and second main walls, the side wall of the shell being generally linear in a direction generally tangential to the storage disk;

a head access aperture formed in the side wall, the aperture for enabling a head to be inserted into the shell to be positioned in operative relationship with respect to the storage disk;

a linear shutter mounted to the side wall of the shell, the shutter being generally linearly movable in the tangential direction along the side wall between a closed position where the shutter covers the aperture and an open position where the shutter exposes the aperture, the linear shutter being a sheet member extending along the first and second main walls and the side wall of the shell, the shutter having first and second wings respectively extending along the first and second main walls and a shutter body interconnecting the first and second wings, the shutter body including a window formed therein, the shutter body covering the head access aperture in the closed position and the window of the shutter body exposing the aperture in the open position;

a compression spring coupled to the shell and to the shutter and biasing the shutter to the closed position, the compression spring having a helical coil wound around an axis, the axis bending when the linear shutter is moved to the open position, the axis being generally coplanar with the storage disk, the compression spring further having a first arm coupling one end of the coil to the shell and a second arm coupling the other end of the coil to the linear shutter, the second arm including a bending elbow dividing the second arm into proximal and distal portions, the bending elbow bending when the shutter is moved to the open position.

* * * * *